United States Patent
Innes

(10) Patent No.: US 9,075,970 B2
(45) Date of Patent: Jul. 7, 2015

(54) SYSTEMS AND METHODS FOR SECURE HANDLING OF SECURE ATTENTION SEQUENCES

(71) Applicant: Citrix Systems, Inc., Fort Lauderdale, FL (US)

(72) Inventor: Andrew Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/013,816

(22) Filed: Aug. 29, 2013

(65) Prior Publication Data

US 2014/0007188 A1  Jan. 2, 2014

Related U.S. Application Data

(63) Continuation of application No. 12/370,891, filed on Feb. 13, 2009, now Pat. No. 8,549,596.

(60) Provisional application No. 61/029,088, filed on Feb. 15, 2008.

(51) Int. Cl.
*G06F 21/30* (2013.01)
*G06F 21/31* (2013.01)
(Continued)

(52) U.S. Cl.
CPC .............. *G06F 21/305* (2013.01); *G06F 21/31* (2013.01); *G06F 2221/2115* (2013.01); *H04L 63/08* (2013.01); *H04L 63/0884* (2013.01); *H04L 63/10* (2013.01); *H04L 67/08* (2013.01)

(58) Field of Classification Search
CPC ......... G06F 12/14; G06F 21/00; G06F 21/78; G06F 2221/21; G06F 21/305
USPC .......................................................... 726/2
See application file for complete search history.

(56) References Cited

U.S. PATENT DOCUMENTS 5,124,909 A   6/1992 Blakely et al.
5,359,660 A * 10/1994 Clark et al. ...................... 726/3
(Continued)

FOREIGN PATENT DOCUMENTS

EP      0 436 365       7/1991

OTHER PUBLICATIONS

Citrix Systems Inc: "Desktop Broker for Citrix Presentation Server? Citrix Presentation Server? 4.0" [Online] Oct. 18, 2006, XP002537607 Retrieved from the Internet: URL: http://support.citrix.com/servlet/KbServlet/download/11402-10215472/Desktop%20Broker%20Administrator%27s%20Guide.pdf [retrieved on Jul. 15, 2009]pp. 17,18 p. 20.
(Continued)

*Primary Examiner* — Dant Shaifer Harriman
(74) *Attorney, Agent, or Firm* — Foley & Lardner LLP; John D. Lanza

(57) ABSTRACT

A method for authenticating, by a trusted component, a user of a desktop appliance to a remote machine includes executing, by a desktop appliance, a user interaction component, responsive to receiving a secure attention sequence from a user. The user interaction component receives authentication credentials associated with the user. The desktop appliance transmits, to a broker service, the received authentication credentials. The broker service authenticates the user, responsive to the received authentication credentials. The broker service transmits, to a remote machine, authentication data associated with the received authentication credentials. The remote machine authenticates the user, responsive to the received authentication data. The remote machine provides, to the desktop appliance, access to a resource requested by the user. In another aspect, a trusted component provides, to a user of a desktop appliance, access to secure desktop functionality provided by a remote machine.

17 Claims, 7 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 5,544,320 A | | 8/1996 | Konrad |
| 5,696,901 A | | 12/1997 | Konrad |
| 5,742,285 A | * | 4/1998 | Ueda .............................. 715/778 |
| 5,974,444 A | | 10/1999 | Konrad |
| 6,996,841 B2 | * | 2/2006 | Kadyk et al. .................... 726/12 |
| 7,370,351 B1 | * | 5/2008 | Ramachandran et al. ......... 726/8 |
| 7,559,083 B2 | * | 7/2009 | Tsang .............................. 726/16 |
| 2007/0179955 A1 | | 8/2007 | Croft et al. |
| 2007/0209081 A1 | * | 9/2007 | Morris ............................. 726/29 |

OTHER PUBLICATIONS

International Preliminary Report on Patentability on PCT/US2009/033998 dated Aug. 17, 2010.
International Search Report on PCT/US2009/033998 dated Dec. 3, 2009.
Notice of Allowance on U.S. Appl. No. 12/370,891 dated Jun. 20, 2013.
Office Action on U.S. Appl. No. 12/370,891 dated Jan. 3, 2013.
Office Action on U.S. Appl. No. 12/370,891 dated Apr. 15, 2012.
Office Action on U.S. Appl. No. 12/370,891 dated Aug. 28, 2012.
Shi Wenchang:"Implementing Operating System Support for Extended Trusted Path in TPM—Capable Environments" [Online] Nov. 2006, XP002537606 Retrieved from the Internet: URL: http://www.springerlink.com/content/v12m315410567270/fulltext.pdf [retrieved on Jul. 15, 2009]Abstract p. 1493, right-hand column, line 23-line 25 p. 1494, right-hand column, lines 11-31 p. 1495, left-hand column, lines 3-6 p. 1495, left-hand column, lines 13-33; figure 1.
Technet.Microsoft.Com: "Windows XP Professional Resource Kit: Configuring Remote Desktop" [Online] Nov. 3, 2005, XP002537605 Retrieved from the Internet: URL: http://technet.microsoft.com/en-us/library/bb457106(printer).aspx [retrieved on Jul. 13, 2009]p. 1, paragraph Overview; figures 8-1 p. 9; tables 8-3.
Technet.Microsoft.Com: "Windows XP Professional Resource kit: Understanding Logon and Authentication" [Online] Nov. 3, 2005, XP002537700 Retrieved from the Internet: URL: http://technet.microsoft.com/en-us/library/bb457114(printer).aspx [retrieved on Jul. 13, 2009] p. 6, lines 19-24 p. 6, line 42—p. 7, line 5 p. 7, line 18—p. 8, line 3; figures 16-1 p. 12,line 23—p. 13, line 10; figures 16-4.
Written Opinion on PCT/US2009/033998 dated Dec. 3, 2009.
Office Action on U.S. Appl. No. 14/013,765 dated Jul. 28, 2014.
Office Action on U.S. Appl. No. 14/013,765 dated Nov. 17, 2014.

* cited by examiner

SYSTEMS AND METHODS FOR SECURE HANDLING OF SECURE ATTENTION SEQUENCES

RELATED APPLICATIONS

The present application claims priority to U.S. patent application Ser. No. 12/370,891, which is allowed, which claims priority to U.S. Provisional Patent Application Ser. No. 61/029,088, entitled "Methods and Systems for Secure Handling of Secure Attention Sequences," filed Feb. 15, 2008, which is incorporated herein by reference.

FIELD OF THE INVENTION

This disclosure generally relates to systems and methods for providing access to remote functionality. In particular, this disclosure relates to methods and systems for providing, by a trusted component, to a user of a desktop appliance, access to secure desktop functionality provided by a remote machine.

BACKGROUND OF THE INVENTION

Conventionally, a desktop appliance is a machine allowing a user to access a resource provided by a remote computer via a networked display protocol such as Citrix ICA, Microsoft RDP, VNC, or the X11 protocol. The remote computer may execute a single user operating system, such as Windows XP or Windows Vista, or a multi-user operating system such as Windows Server 2003 or 2008 that allows multiple independent connections to separate virtual desktops, the different users of the independent connections capable of having different levels of authorization privileges. The desktop appliance may execute a local operating system to handle basic functions, such as receiving user input and rendering the output data generated by the resource provided by the remote computer.

In some systems, the desktop appliance may be configured to operate in such a way that the user of the desktop appliance is unaware that the resource is not executing locally on the desktop appliance. This lack of awareness may leave the user vulnerable to security risks. In other systems, the user is aware that the resource is not executing locally but is prevented from interacting with the local operating system, or may be provided with limited access to the local operating system. In some of these conventional systems, a user may be prevented from accessing desired functionality. In other conventional systems, providing a user with multiple interfaces for accessing both a local and remote operating system may lead to user confusion and inefficiency.

BRIEF SUMMARY OF THE INVENTION

In one aspect, a method for providing, by a trusted component, to a user of a desktop appliance, access to secure desktop functionality provided by a remote machine includes executing, by a trusted computing base within an operating system executing on a desktop appliance, a user interaction component, responsive to receiving a secure attention sequence from a user. The method includes receiving, by the user interaction component, a request for access to a local secure desktop function. The method includes transmitting, by the desktop appliance, to a broker service, the received request. The method includes providing, by the remote machine, to the desktop appliance, access to remote secure desktop functionality. In some aspects, the methods and systems described herein ensure that the security procedures that are appropriate for accessing a resource executed by a local machine will provide similar security benefits and guarantees when used by a user accessing a remote resource.

In another aspect, a method for authenticating, by a trusted component, a user of a desktop appliance to a remote machine includes executing, by a desktop appliance, a user interaction component, responsive to receiving a secure attention sequence from a user. The method includes receiving, by the user interaction component, authentication credentials associated with the user. The method includes transmitting, by the desktop appliance, to a broker service, the received authentication credentials. The method includes authenticating, by the broker service, the user, responsive to the received authentication credentials. The method includes transmitting, by the broker service, to a remote machine, authentication data associated with the received authentication credentials. The method includes authenticating, by the remote machine, the user, responsive to the received authentication data. The method includes providing, by the remote machine, to the desktop appliance, access to a resource requested by the user.

In still another aspect, a method for authenticating, by a trusted component, a user of a desktop appliance to a remote machine includes executing, by a desktop appliance, a user interaction component, responsive to receiving a secure attention sequence from a user. The method includes receiving, by the user interaction component, authentication credentials associated with the user. The method includes authenticating, by the user interaction component, the user, responsive to the received authentication credentials. The method includes transmitting, by the desktop appliance, to a broker service, authentication data associated with the received authentication credentials. The method includes transmitting, by the broker service, to a remote machine, authentication data associated with the received authentication credentials. The method includes authenticating, by the remote machine, the user, responsive to the received authentication data. The method includes providing, by the remote machine, to the desktop appliance, access to a resource requested by the user.

In yet another aspect, a system for authenticating, by a trusted component, a user of a desktop appliance to a remote machine includes a user interaction component, a broker service, and a desktop host server. The user interaction component, executed by a desktop appliance, receives, from a user, authentication credentials associated with the user. The broker service, executing on a broker server, receives the authentication credentials and authenticates the user. The desktop host server receives, from the broker service, authentication data associated with the received authentication credentials, authenticates the user responsive to the received authentication data, and establishes a connection with the desktop appliance.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
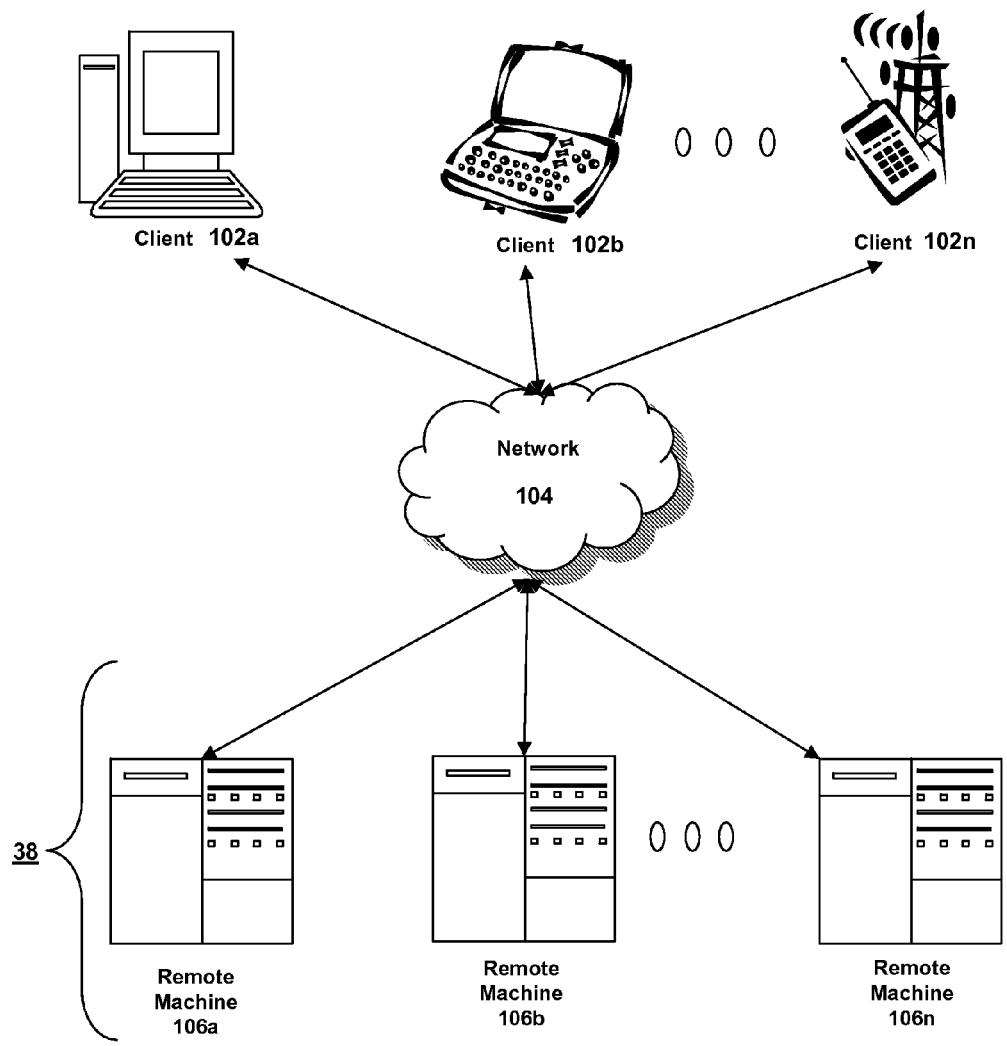
FIG. 1A is a block diagram depicting an embodiment of a network environment comprising local machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. Alternatively, the remote machines 106 may be geographically dispersed from each other or from the clients 102 and communicate over a network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 can be a local-area network (LAN), such as a company Intranet, a metropolitan area network (MAN), or a wide area network (WAN), such as the Internet or the World Wide Web. The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

Although only three client machines 102 and only three remote machines 30 are depicted in the embodiment shown in FIG. 1A, it should be understood that the system may provide multiple ones of any or each of those components. For example, in one embodiment, the system may include multiple, logically-grouped remote machines 106, one or more of which is available to provide a client machine 102a, 102b access to computing resources. In these embodiments, the logical group of remote machines may be referred to as a "server farm" or "machine farm," indicated in FIG. 1A as machine farm 38. A machine farm 38 may be administered as a single entity. In some embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

A server 106 may be a file server, application server, web server, proxy server, appliance, network appliance, gateway, application gateway, gateway server, virtualization server, deployment server, SSL VPN server, or firewall. In one embodiment, the server 106 provides the functionality of a web server. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment. In some embodiments, remote machines 30 may have the capacity to function as a master network information node monitoring resource usage of other machines in the farm 38. Remote machines 106 may be referred to as execution machines, intermediate machines, broker machines, intermediate broker machines, or worker machines.

In some embodiments, the web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The machine farm 38 can be heterogeneous, that is, one or more of the remote machines 106 can operate according to one type of operating system platform (e.g., WINDOWS NT, manufactured by Microsoft Corp. of Redmond, Wash.), while one or more of the other remote machines 106 can operate according to another type of operating system platform (e.g., Unix or Linux). Additionally, a heterogeneous machine farm 38 may include one or more remote machines 106 operating according to a type of operating system, while one or more other remote machines 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems of Fort Lauderdale, Fla.; the VirtualServer or virtual PC hypervisors provided by Microsoft or others.

In one embodiment, remote machines 106 in the machine farm 38 may be stored in high-density racking systems, along with associated storage systems, and located in an enterprise data center. In this embodiment, consolidating the machines in this way may improve system manageability, data security, the physical security of the system, and system performance by locating machines and high performance storage systems on localized high performance networks. Centralizing the machines and storage systems and coupling them with advanced system management tools allows more efficient use of machine resources.

In many embodiments, the remote machines 106, and the client machines 102, are provided as computers or computer servers, of the sort manufactured by Apple Computer, Inc., of Cupertino, Calif., International Business Machines of White Plains, N.Y., Hewlett-Packard Corporation of Palo Alto, Calif. or the Dell Corporation of Round Rock, Tex. In some embodiments, the remote machines 106 may be blade servers, servers, workstation blades or personal computers executing hypervisors emulating hardware required for virtual machines providing access to computing environments. In these embodiments, a single physical machine may provide multiple computing environments.

In some embodiments, a client 102 communicates with a server 106. In one embodiment, the client 102 communicates directly with one of the servers 106 in a server farm 38. In another embodiment, the client 102 executes a program neighborhood application to communicate with a server 106 in a server farm 38. In still another embodiment, the server 106 provides the functionality of a master node. In some embodiments, the client 102 communicates with the server 106 in the server farm 38 through a network 104. Over the network 104, the client 102 can, for example, request execution of various applications hosted by the servers 106a-106n in the server farm 38 and receive output of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106b hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER, or CITRIX XENDESKTOP, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

The clients 102 may be referred to as client nodes, client machines, endpoint nodes, or endpoints. In some embodiments, a client 102 has the capacity to function as both a client node seeking access to resources provided by a remote machine and as a remote machine providing access to hosted resources for other clients 102a-102n. A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client. In some embodiments, the client 102 communicates with a remote machine 106 via a presentation layer protocol such as, the Independent Computing Architecture (ICA) protocol, manufactured by Citrix Systems, Inc. of Fort Lauderdale, Fla.; the RDP protocol, manufactured by Microsoft Corp. of Redmond, Wash.; the X11 protocol, provided by the X.org Foundation; or the Virtual Network Computing (VNC) protocol, manufactured by AT&T Bell Labs.

Figure 1B:
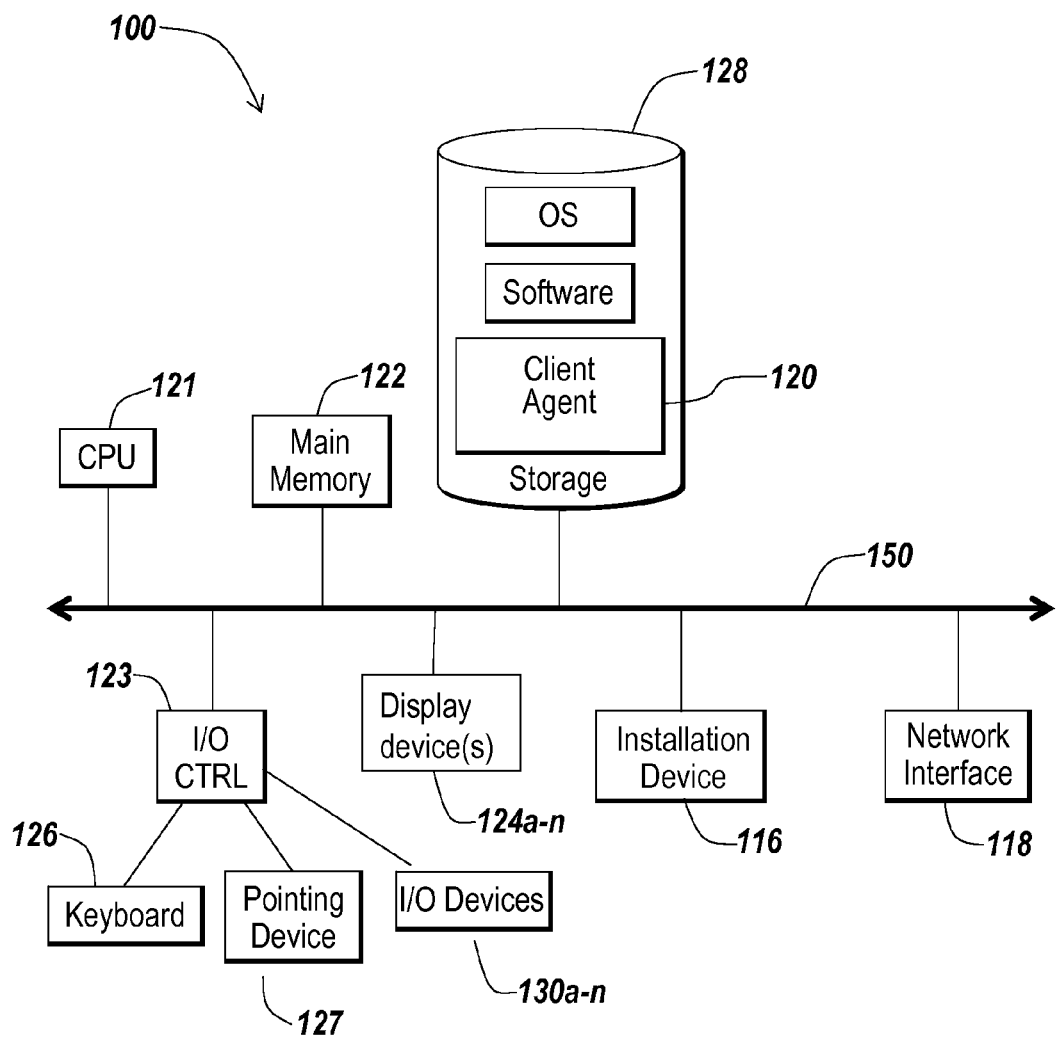
FIGS. 1B and 1C are block diagrams depicting embodiments of a computing device useful in connection with the methods and systems described herein.
Figure 1C:
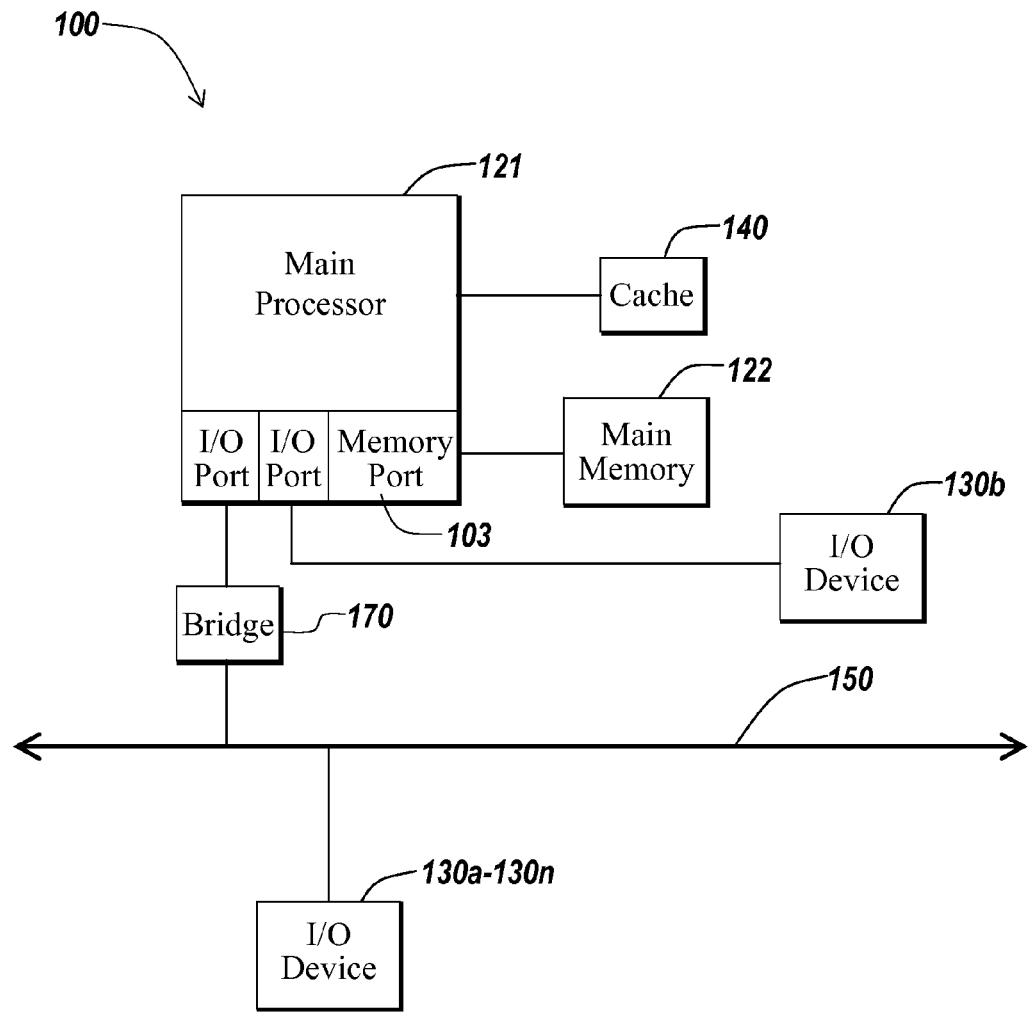

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface (SCSI) bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others. A remote machine 106 and a client 102 may be heterogeneous, executing different operating systems.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute. In further embodiments, the server 106 provides access to a hosted desktop session executing on the server 106. In one of these embodiments, the hosted desktop session is not required to execute within a virtual machine.

In some embodiments, a desktop appliance communicates via a network with a broker service to authenticate a user of the desktop appliance and receive information needed to connect to the remote machine. In some systems, the remote computer provides a user of a client machine with access to a resource, which may include, without limitation, computing environments (including, for example, desktops), applications, documents, files (including user data and user configuration files), and hardware resources. In one of these embodiments, a brokered connection model allows for centralized policy and authorization control, amongst many other benefits. However, when using desktop appliances, a complication may arise if certain tasks, including authentication, require user interaction with the desktop appliance itself prior to connection to the remote desktop; other tasks may require interaction with the remote machine while the desktop appliance is connected to the remote machine, and still other tasks require user interaction with the desktop appliance while it is connected to the remote desktop.

As an example of one of these complications, in some embodiments the broker service is trusted to authenticate all users of the system, but not all desktop hosts are trusted to receive connections from all users of the system. In one of these embodiments, receiving a connection may result in receiving the ability to impersonate the connecting user, usually by means of receiving their explicit credentials. In another of these embodiments, this partial level of trust in desktop hosts is allowed because, in practice, some users will be granted local administrator privileges on the desktop host(s) they normally use, for reasons of application compatibility or user demand for desktop control requiring local administrative rights. In still another of these embodiments, a security policy may require employees not to disclose their credentials to anyone, including other employees, which may result in employees needing certain local administrator privileges. In yet another of these embodiments, many organizations have at least one employee with very high levels of access privileges who should only log on to hosts that are suitably configured (and trusted to be so configured) to not abuse their credentials or privileges or expose them to misuse by others. However, in one of these embodiments, requiring the local user to provide credentials upon local log-on and upon log-on to a remote machine and potentially upon log-on to particular resources provided by the remote machine may confuse the user, may impose an intolerable user interaction burden, or may limit the ability of the desktop appliance to present remotely-executing resources to a user as if the resources were executing locally.

In some embodiments, a method for authenticating a user by a trusted local component allows for local authentication of a user regardless of a type of interaction required by the task. In one of these embodiments, the method includes providing functionality for processing security procedures or requests to access a secure desktop functionality. One such security procedure for accessing a local Windows desktop includes the use of a Secure Attention Sequence (SAS).

In one embodiment, methods and systems are described in which a fully-trusted entity (such as a part of a desktop appliance) processes the Secure Attention Sequence (SAS) and in which other trusted entities (including, for example, a broker service and a remote machine to which the desktop appliance is connected) provide access to and process the associated tasks that are accessible after the entering of the SAS. In another embodiment, this is done in a way that minimizes user confusion, by maintaining the user interactions familiar to users of local WINDOWS desktops. In other embodiments, this disclosure describes methods and systems to achieve this behavior when the desktop appliance is running a WINDOWS operating system such as WINDOWS XP to leverage existing local operating system components that normally receive and process the SAS without replacing those components.

Figure 2:
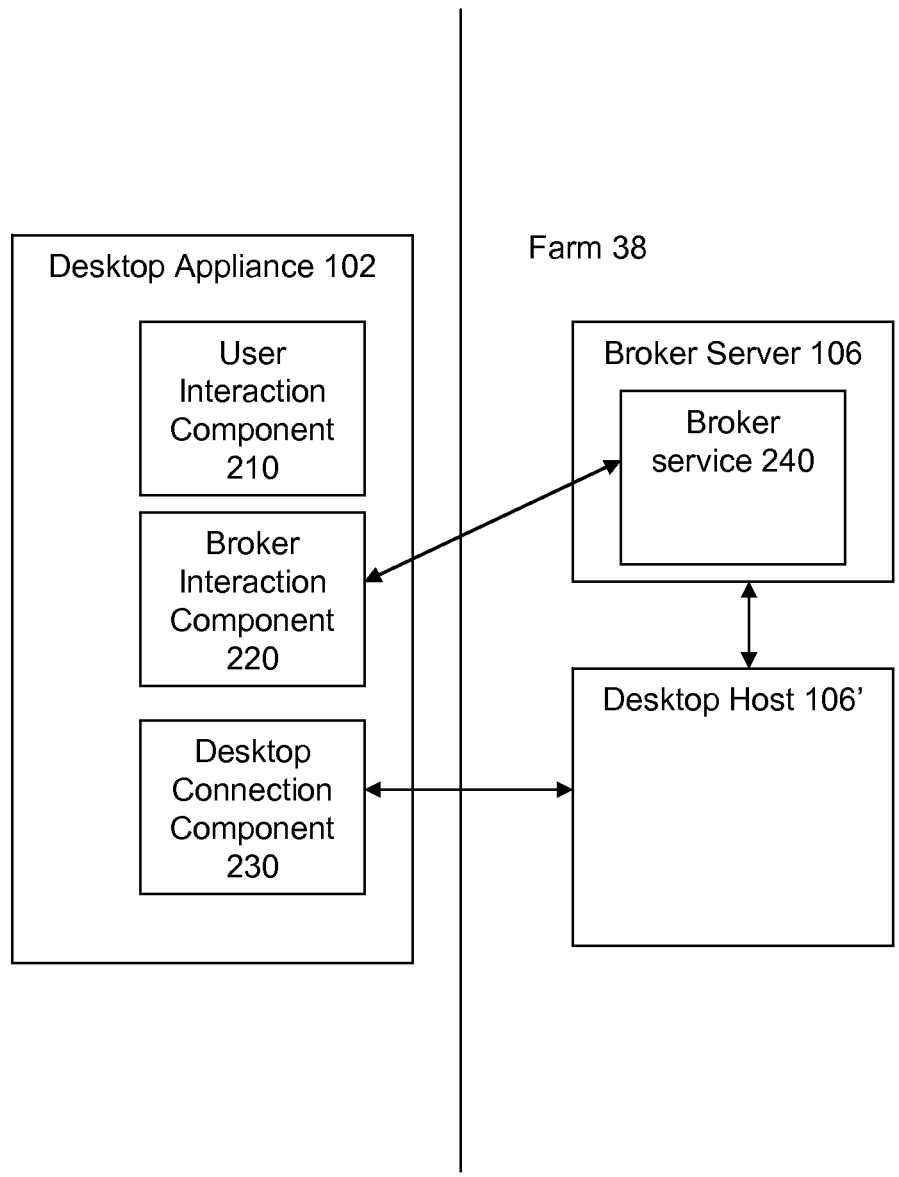
FIG. 2 is a block diagram depicting one embodiment of a system for secure handling of a secure attention sequence.

Referring now to FIG. 2, a block diagram depicts one embodiment of a system for secure handling of a secure attention sequence. In brief overview, the desktop appliance 102 includes a user interaction component 210, a broker interaction component 220, and a desktop connection component 230. A broker server 106 includes a broker service 240 and is in communication with a remote machine 106'. The desktop appliance 102 executes a user interaction component 210. The user interaction component 210 receives authentication credentials associated with the user. The desktop appliance 102 transmits, to a broker service 240, the received authentication credentials. The broker service 240, executing on the broker server 106, receives the authentication credentials and authenticates the user. The broker service 240 transmits, to the remote machine 106', which may be referred to as a desktop host 106' or a desktop host server 106', authentication data associated with the received authentication credentials. The desktop host 106' authenticates the user, responsive to the received authentication data. The desktop host 106' provides, to the desktop appliance, access to a resource requested by the user. In some embodiments, the desktop host 106' authenticates the user when the desktop connection component 230 initiates establishment of a connection between the desktop appliance 102 and the desktop host 106'. The desktop appliance 102 establishes a connection with the desktop host 106'.

In one embodiment, the desktop appliance 102 executes a user interaction component 210, responsive to receiving a secure attention sequence from a user. In another embodiment, the desktop appliance 102 executes a user interaction component 210, responsive to identifying a key combination entered by a user requesting access to a security-critical task. In some embodiments, the secure attention sequence is a key combination entered by a user requesting access to a security-critical task. In one of these embodiments, the secure attention sequence is a key combination of the control key, the alt key and the delete key. In other embodiments, other user interactions are used in place of the key combination, such as pressing a dedicated hardware button or inserting a smartcard or portable storage device into an attached reader. In one of these embodiments, the smartcard or portable storage device stores authentication credentials.

In some embodiments, a module or component within the operating system has control over the user interface and requires the user to enter the secure attention sequence before the user performs security-critical tasks, such as authenticating or changing password. In other embodiments, the operating system requires a user to entire a secure attention sequence before allowing the user to access resources executed by the operating system. In still other embodiments, this mechanism exists to counter risks from Trojan programs running without system privileges masquerading as a log-on interface. In further embodiments, use of the Secure Attention Sequence is one aspect of best practices for protecting against the compromising of user credentials by untrusted entities and may provide protection by ensuring there is a 'trusted path' to entities that are trusted to handle user credentials.

In some embodiments of a brokered connection model, there is a trust relationship between a desktop appliance and a broker service. In one of these embodiments, the desktop appliance 102 is trusted to receive credentials (such as a username and password) from the user and communicate the received credentials to the authorized broker service 240, or otherwise use them to authenticate the user to the broker service 240. In other embodiments, the broker service 240 is trusted to authenticate users. In one of these embodiments, the broker service 240 is trusted to receive and validate user credentials, and to orchestrate access to an appropriate desktop host or hosts for that user. In another of these embodiments, the logon to a desktop or other resource provided by a desktop host 106 may occur without further user interaction, for example, as part of the process of the desktop appliance connecting to the desktop host. In still other embodiments, the broker service 240 orchestrates access to an appropriate desktop host or hosts for that user without authenticating the user. In yet other embodiments, the broker service 240 orchestrates access to an appropriate desktop host or hosts for that user and a separate entity (such as the desktop host 106') authenticates the user.

Referring now to FIG. 2, and in greater detail, a desktop host 106' may be a remote machine 106' as described above in connection with FIG. 1A-1C. In another embodiment, the desktop host 106' is a physical PC located on a corporate network, a physical server (e.g., a blade PC) in a data center, or a virtual machine in a data center.

In one embodiment, the desktop appliance 102 is a client machine 102 as described above in connection with FIG. 1A-1B. In another embodiment, a desktop appliance 102 is any device with local computing power with which a user can interact. In still another embodiment, a desktop appliance 102 is a device dedicated to providing access to resources provided by remote machines via a presentation layer protocol, in such a way that the user need not be aware that the machine they are using is actually remote. In still even another embodiment, the desktop appliance 102 is a multi-function thin client device, capable of providing access to a variety of services and resources provided by remote machines, such as presentation servers, terminal services, and web applications. In yet another embodiment, the desktop appliance 102 executes an operating system providing guaranteed local interception of the Secure Attention Sequence (normally, a combination of the control key, alt key, and delete key).

In one embodiment, the desktop appliance 102 is a Devon IT SAFEBOOK manufactured by Devon IT, Inc., of King of Prussia, Pa. In another embodiment, the desktop appliance is a Chip PC Plug PC manufactured by Chip PC Technologies of Tirat Carmel, Israel and Irving, Tex., USA. In still another embodiment, the desktop appliance 102 is an HP Compaq 2533t or 6720 Mobile Thin Client, or an HP Compaq t5135 or t5730, or an HP Compaq t5530 or t5735 Thin Client, manufactured by Hewlett-Packard Company of Palo Alto, Calif. In yet another embodiment, the desktop appliance 102 is an IGEL Compact series appliance manufactured by IGEL Technology, Inc., of Fort Lauderdale, Fla. In some embodiments, the desktop appliance 102 is a client machine 102 in which the user has limited or no access to functionality provided by a local operating system.

In some embodiments, the desktop appliance 102 executes a plurality of software components that are part of or registered with the desktop appliance operating system. In one of these embodiments, the software components are able to communicate with the broker service 240 and the remote desktop host. In another of these embodiments, the software components are able to support direct uncorrupted interaction with the user by means of locally generated user interface screens and protected user input focus. In some embodiments, the plurality of software components used depends on an operating system executed by the desktop appliance 102.

The desktop appliance 102 includes a user interaction component 210. In one embodiment, the user interaction component 210 controls information displayed to the user and receives input from the user. In another embodiment, the user interaction component 210 is part of the operating system executing on the desktop appliance 102. In still another embodiment, the user interaction component 210 is part of, or in communication with, a presentation layer protocol client agent. In still another embodiment, the desktop appliance 102 executes a trusted user interaction component 210, responsive to receiving a secure attention sequence from a user. In still even another embodiment, the desktop appliance 102 executes a trusted user interaction component 210 prior to receiving a secure attention sequence from a user. The trusted user interaction component 210 receives authentication credentials associated with the user. In some embodiments, the desktop appliance 102 includes a transmitter for transmitting, to the broker service 240, the received authentication credentials.

In some embodiments, the user interaction component 210 receives authentication credentials from a user. In one of these embodiments, the user interaction component 210 includes an interface through which it receives the authentication credentials. In another of these embodiments, the user interaction component 210 transmits the received authentication credentials to the broker interaction component 220. In still another of these embodiments, the user interaction component 210 includes an interface with which the broker interaction component 220 can interact to retrieve the authentication credentials. In other embodiments, the desktop appliance 102 includes a trusted computing base in an operating system executed by the desktop appliance 102, the trusted computing base executing the user interaction component responsive to receiving a secure attention sequence from the user. In some embodiments, a trusted computing base (TCB) of a computer system includes at least one hardware, firmware, and/or software component upon which security of the computer system depends.

In some embodiments, the user interface component 210 includes an authentication module for authenticating the user responsive to the received authentication credentials. In one of these embodiments, the desktop appliance includes a transmitter transmitting, to the broker service, an indication that the user interaction component authenticated the user. In another of these embodiments, the transmitter transmits, to the broker service, authentication data associated with the authentication credentials.

In one embodiment, authentication data is data that can be used to verify the identity of a user but does not reveal the user's underlying authentication credentials. In another embodiment, authentication data is generated based upon received authentication credentials. In still another embodiment, the user interaction component 210 generates the authentication data. In still even another embodiment, the user interaction component 210 includes a security service generating the user authentication data. In yet another embodiment, the user interaction component 210 uses an external authentication service, such as a Key Distribution Center in a Kerberos environment or Active Directory in a Windows-based environment, to generate the authentication data. In some embodiments, authentication data includes, by way of example and without limitation, a Kerberos ticket and associated Kerberos authenticator. In other embodiments, by transmitting authentication data, user-provided authentication credentials need not be transmitted over a network. In further embodiments, authentication data is generated independent of a method used by a user to authenticate to the desktop appliance 102. Thus, for example, a Kerberos ticket for the user of a desktop appliance 102 is obtained whether the user uses a username-password combination or a biometric to authenticate to the desktop appliance 102.

In one embodiment, the desktop appliance 102 executes a broker interaction component 220. In one embodiment, the broker interaction component 220 communicates with the broker service 240 using a presentation layer protocol. In another embodiment, the broker interaction component 220 communicates with the broker service 240 using a web service protocol. In another embodiment, the broker interaction component 220 receives authentication credentials from the user interaction component 210. In still even another embodiment, the broker interaction component 220 receives the authentication credentials from an interface provided by the user interaction component 210. In yet another embodiment, the broker interaction component 220 transmits the received authentication credentials to the broker service 240. In some embodiments, the desktop appliance 102 includes a transmitter transmitting the received authentication credentials to the broker service 240.

In one embodiment, the desktop appliance 102 executes a desktop connection component 230 communicating with the remote machine 106' across an established connection. In one embodiment, the desktop connection component 230 communicates with the desktop host 106' by a secure network protocol or presentation layer protocol such as Citrix ICA that allows multiple channels of communication in each direction. In another embodiment, the desktop connection component 230 is part of, or in communication with, a presentation layer protocol client agent. In still another embodiment, the desktop component 230 manages the display on the desktop appliance 102 of output data generated by a resource executing on the desktop host 106'. In still another embodiment, the desktop connection component 230 receives, from the broker service 240, information associated with a desktop host 106'. In yet another embodiment, the desktop connection component 230 establishes a connection with the desktop host 106'.

In some embodiments, the desktop connection component 230 executes on the desktop appliance 102 and communications with the remote machine 106 across an established connection.

The broker server 106 includes a broker service 240 and is in communication with a desktop host 106'. In one embodiment, the broker service 240 executes on the broker server 106, receives the authentication credentials and authenticates the user. In another embodiment, the broker service 240 is controlled by a trusted administrator. In still another embodiment, the broker service 240 is accessible from the desktop appliance 102 via an untrusted network. In still even another embodiment, the broker service 240 includes functionality for identifying desktop hosts 106' authorized to receive connections from specified users; for example, the broker service 240 may access a directory of available desktop hosts 106'. In yet another embodiment, the broker service 240 provisions a desktop host 106 to accept a connection from a desktop appliance 102. The broker service 240 transmits, to a desktop host 106', authentication data associated with the received authentication credentials. In one embodiment, the remote machine (i.e., the desktop host 106') receives, from the broker service 240, the authentication data associated with the received authentication credentials, authenticates the user responsive to the received authentication data, and establishes a connection with the desktop appliance. In some embodiments, the broker service 240 includes an authentication module receiving authentication credentials and authenticating the user.

In one embodiment, the desktop host 106' is able to receive connections from the desktop appliance 102 via an untrusted network. In another embodiment, the desktop host 106' is registered with the broker service 240 by a trusted administrator. The desktop host 106' authenticates the user, responsive to the received authentication data. In some embodiments, the desktop host 106' includes an authentication module receiving authentication credentials and authenticating the user.

In one embodiment, the desktop host 106' receives, from the desktop connection component 230, a request to establish a connection with the desktop appliance 102. In another embodiment, the desktop host 106' requests, from the broker service 240, authorization to establish the requested connection. In still another embodiment, the desktop host 106' requests, from the broker service 240, authentication of the user of the desktop appliance 102. In still even another embodiment, the broker service 240 transmits, to the desktop host 106', authentication data associated with the user of the desktop appliance 102. In yet another embodiment, the desktop host 106' allows the user of the desktop appliance 102 to connect to a resource provided by the desktop host 106', responsive to the received authentication data. In some embodiments, the authentication data is generated from the authentication credentials. In other embodiments, the authentication data includes the authentication credentials. In further embodiments, the desktop host 106' executes an agent—such as a presentation layer protocol agent—to provide, to the desktop appliance 102, access to a resource executed by the desktop host 106' and requested by a user of the desktop appliance 102.

In one embodiment, a method for secure handling of secure attention sequences allows safely brokering connections to desktop hosts that are only trusted for individual users, by ensuring that the Secure Attention Sequence provides similar benefits and security guarantees as for a Windows desktop PC, while ensuring the user experience is equivalent to that of a Windows desktop PC.

In one embodiment, a method for secure handling of secure attention sequences provides this behavior when the desktop appliance is running a Windows operating system such as Windows XP without replacing the local operating system components that normally receive and process the SAS. This minimizes the amount of new code and attendant security risks or assurance burdens. This method also allows the broker interaction and desktop connection components, which are exposed to attack via network connections, to run with less privilege than the user interaction component thus improving security of the desktop appliance 102.

Figure 3A:
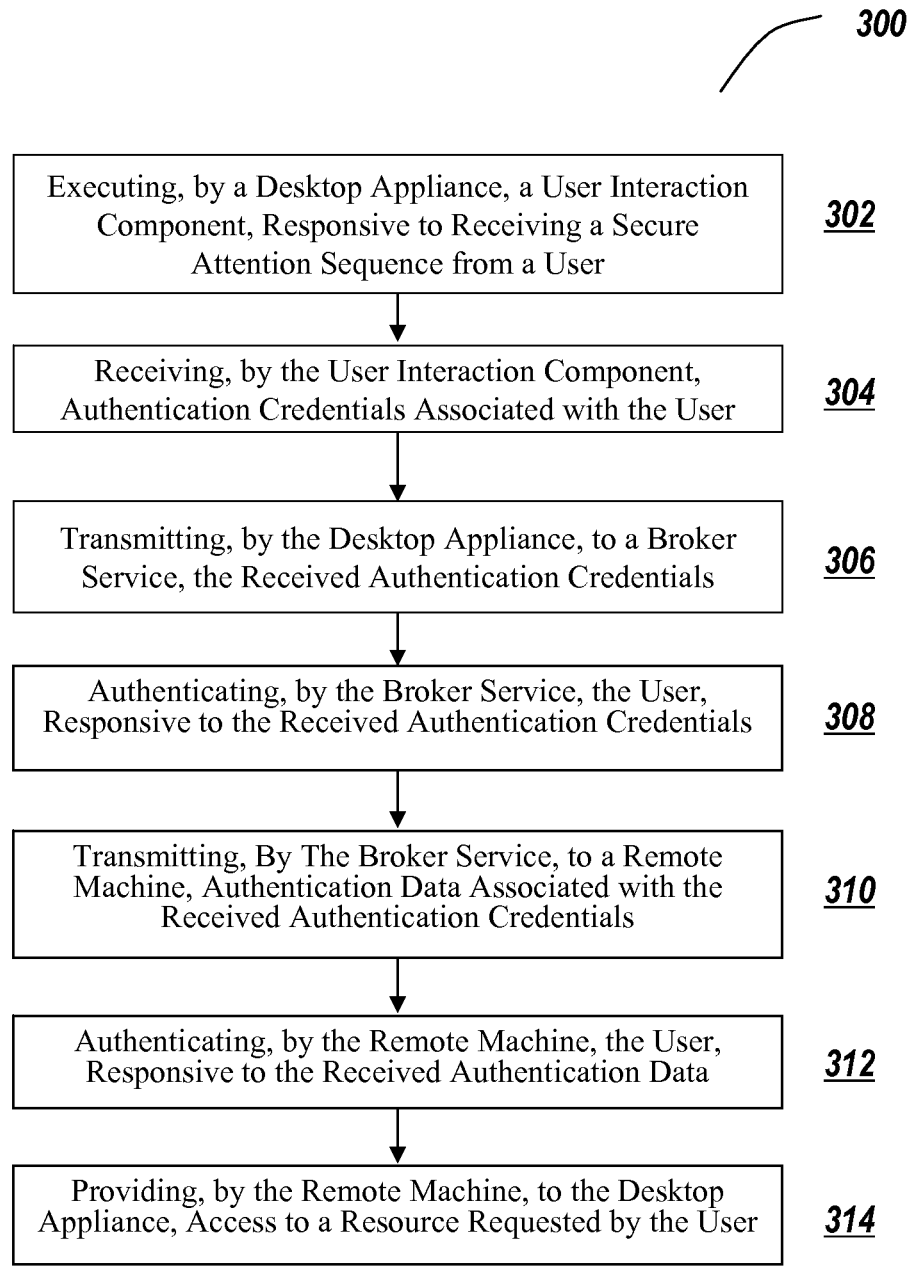
FIG. 3A is a flow diagram depicting one embodiment of a method for authenticating, by a trusted component, a user of a desktop appliance to a remote machine.

Referring now to FIG. 3A, a method for authenticating, by a trusted component, a user of a desktop appliance to a remote machine, the method 300 includes executing, by a desktop appliance, a user interaction component, responsive to receiving a secure attention sequence from a user (302). The method includes receiving, by the user interaction component, authentication credentials associated with the user (304). The method includes transmitting, by the desktop appliance, to a broker service, the received authentication credentials (306). The method includes authenticating, by the broker service, the user, responsive to the received authentication credentials (308). The method includes transmitting, by the broker service, to a remote machine, authentication data associated with the received authentication credentials (310). The method includes authenticating, by the remote machine, the user, responsive to the received authentication data (312). The method includes providing, by the remote machine, to the desktop appliance, access to a resource requested by the user (314). In one embodiment, upon authenticating the user, the broker service 240 identifies and provisions a remote machine 106' providing access to a resource requested by the user and sends the desktop appliance connection information for use in establishing a connection with the remote machine 106'. In another embodiment, upon receiving a connection establishment request from the desktop appliance, the remote machine 106' requests and receives authentication data associated with the user from the broker service.

Referring now to FIG. 3A, and in greater detail, the desktop appliance executes a user interaction component, responsive to receiving a secure attention sequence from a user (302). In some embodiments, the desktop appliance 102 executes the user interaction component 202, responsive to identifying a key combination entered by a user requesting access to a security-critical task. In other embodiments, a trusted computing base within an operating system executed by the desktop appliance executes the user interaction component 202. In one embodiment, the user turns on the desktop appliance 102, booting the local operating system. In another embodiment, an operating system executing on the desktop appliance 102 enters a 'pre-authenticated' state causing it to display a screen indicating the desktop appliance 102 is available for use. In still another embodiment, the user generates the Secure Attention Sequence (e.g., the user types a key combination of the control key, the alt key and the delete key). In yet another embodiment, the operating system invokes the user interaction component 210 for authentication of the user.

The user interaction component receives authentication credentials associated with the user (304). In one embodiment, the user submits credentials to the user interaction component 210. In another embodiment, the user interaction component 210 coordinates with the operating system to validate the credentials and create a local logon session. In still another embodiment, the user interaction component 210 passes full control over the display and user input focus to the broker interaction component 220. In yet another embodiment, the user interaction component 210 transmits the user credentials to the broker interaction component 220.

The desktop appliance transmits, to a broker service, the received authentication credentials (306). In one embodiment, the broker interaction component 220 transmits the authentication credentials to the broker service 240. In another embodiment, the broker interaction component 220 communicates with the broker service 240 to request remote desktop connection information.

The broker service authenticates the user, responsive to the received authentication credentials (308). In one embodiment, the broker service 240 validates and responds to the request from the broker interaction component 220 for remote desktop connection information. The broker service transmits, to a remote machine, authentication data associated with the received authentication credentials (310). In one embodiment, the broker service 240 identifies a remote machine 106' providing access to secure desktop functionality requested by the user.

The remote machine authenticates the user, responsive to the received authentication data (312). In some embodiments, the remote machine authenticates the user upon receiving the authentication data. In other embodiments, the remote machine authenticates the user upon receiving a request from the desktop appliance for access to resources provided by the remote machine.

The remote machine provides, to the desktop appliance, access to a resource requested by the user (314). In one embodiment, the remote machine 106' provides, to the desktop appliance 102, access to a computing environment associated with the user. In one embodiment, the broker service 240 orchestrates the availability of a suitable desktop host 106' which is authorized and ready to receive a connection request from the desktop appliance 102. In another embodiment, the broker service 240 communicates the desktop host connection information to the broker interaction component 220. In still another embodiment, the broker interaction component 220 invokes the desktop connection component 230, passing it full control over the display and user input focus. In yet another embodiment, the desktop connection component 230 uses the desktop host connection information and communicates a connection request to the desktop host 106'. In some embodiments, the desktop host 106' accepts the connection request. In one of these embodiments, the desktop host 106' communicates with the broker service 240 to validate relevant connection information. In another of these embodiments, the desktop connection component 230 establishes a connection from the desktop appliance 102 to the desktop host 106'. In still another of these embodiments, the desktop connection component 230 directs the display, on the desktop appliance 102, of output data generated by a resource executed by the desktop host 106'. In yet another embodiment, the user interacts with the remote desktop host 106' via the desktop appliance 102, with all user input, except for the Secure Attention Sequence and related input, being passed to the desktop host 106' for processing.

Figure 3B:
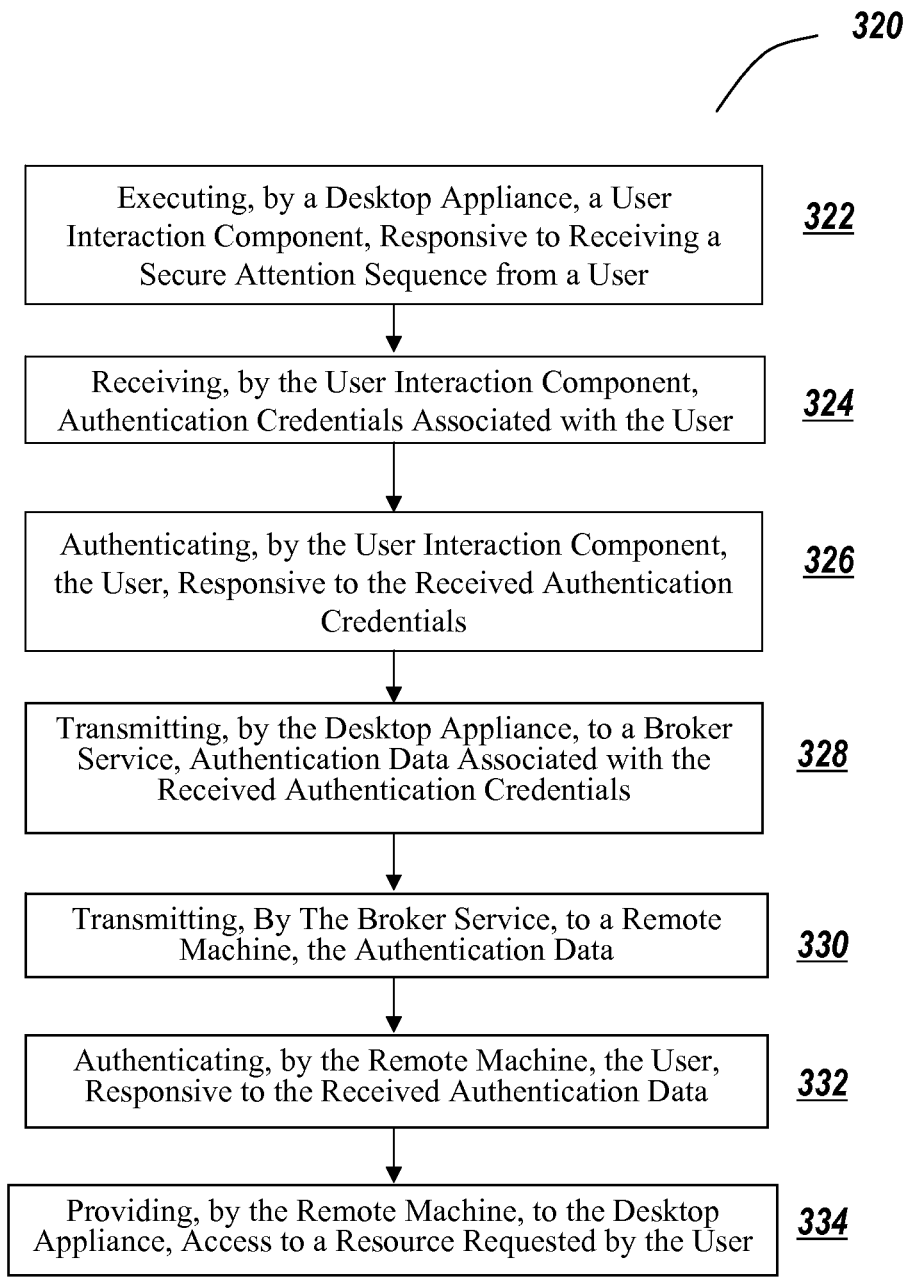
FIG. 3B is a flow diagram depicting another embodiment of a method for authenticating, by a trusted component, a user of a desktop appliance to a remote machine.

Referring now to FIG. 3B, a flow diagram depicts one embodiment of the steps taken in a method for authenticating, by a trusted component, a user of a desktop appliance to a remote machine. The method 320 includes executing, by a desktop appliance, a user interaction component, responsive to receiving a secure attention sequence from a user (322). In one embodiment, the desktop appliance 102 executes the user interaction component 210, responsive to identifying a key combination entered by a user requesting access to a security-critical task. In another embodiment, the desktop appliance 102 executes the user interaction component 210 as described above in connection with FIGS. 2 and 3A. The method includes receiving, by the user interaction component, authentication credentials associated with the user (324). In one embodiment, the user interaction component 210 receives the authentication credentials as described above in connection with FIGS. 2 and 3A. The method includes authenticating, by the user interaction component, the user, responsive to the received authentication credentials (326). In one embodiment, the user interaction component includes a security service for authenticating users. The method includes transmitting, by the desktop appliance, to a broker service, authentication data associated with the received authentication credentials (328). In one embodiment, the method includes transmitting, to the broker service, an indication that the user interaction component authenticated the user. The method includes transmitting, by the broker service, to a remote machine, authentication data associated with the received authentication credentials (330). In one embodiment, the method includes identifying, by the broker service, a remote machine providing access to secure desktop functionality requested by the user. The method includes authenticating, by the remote machine, the user, responsive to the received authentication data (332). The method includes providing, by the remote machine, to the desktop appliance, access to a resource requested by the user (334). In one embodiment, the method includes establishing, by the desktop appliance, a connection with the remote machine. In another embodiment, the method includes providing, by the remote machine, to the desktop appliance, access to a computing environment associated with the user.

In one embodiment, when a user generates the SAS during connection to a remote desktop, while the remote desktop is available for normal interactive use, the operating system on the desktop appliance 102 invokes the local user interaction component 210 to offer 'secure desktop' functionality, which may be substantially equivalent to the functionality provided by the Windows Security dialog. In some embodiments, this invocation passes full control over display and input focus to the user interaction component 210 but does not otherwise interfere with a connection to the remote desktop provided by the desktop host 106'. In one of these embodiments, if the user dismisses the secure desktop dialog or fails to invoke a function within an appropriate time period the user interaction component 210 returns full control over display and input focus to the desktop connection component 230. In another of these embodiments, the user invokes the desired secure desktop function and the user interaction component 210 receives a request for access to secure desktop functionality, as will be described in greater detail below in connection with FIG. 4.

Referring again to FIG. 2, in some embodiments, the system is a system for providing, by a trusted component, to a user of a desktop appliance, access to secure desktop functionality provided by a remote machine. The user interaction component 210, executed by a trusted computing base within an operating system executing on a desktop appliance 102, receives a request for access to a local secure desktop function. The broker service 240 receives the request from the desktop appliance 102, identifies a remote machine 106' and transmits the received request to the remote machine 106'. The remote machine 106' receives the request and provides, to the desktop appliance 102, access to remote secure desktop functionality. In some embodiments, the remote machine 106' is referred to as a desktop host 106' because the remote machine 106' hosts a desktop on behalf of the desktop appliance 102. In other embodiments, the broker interaction component 220 transmits, to the broker service 240, the request for access to the local secure desktop function and the broker service 240 transmits the request to the desktop host 106'. In still other embodiments, the desktop connection component 230 transmits the request directly to the desktop host 106'.

Figure 4:
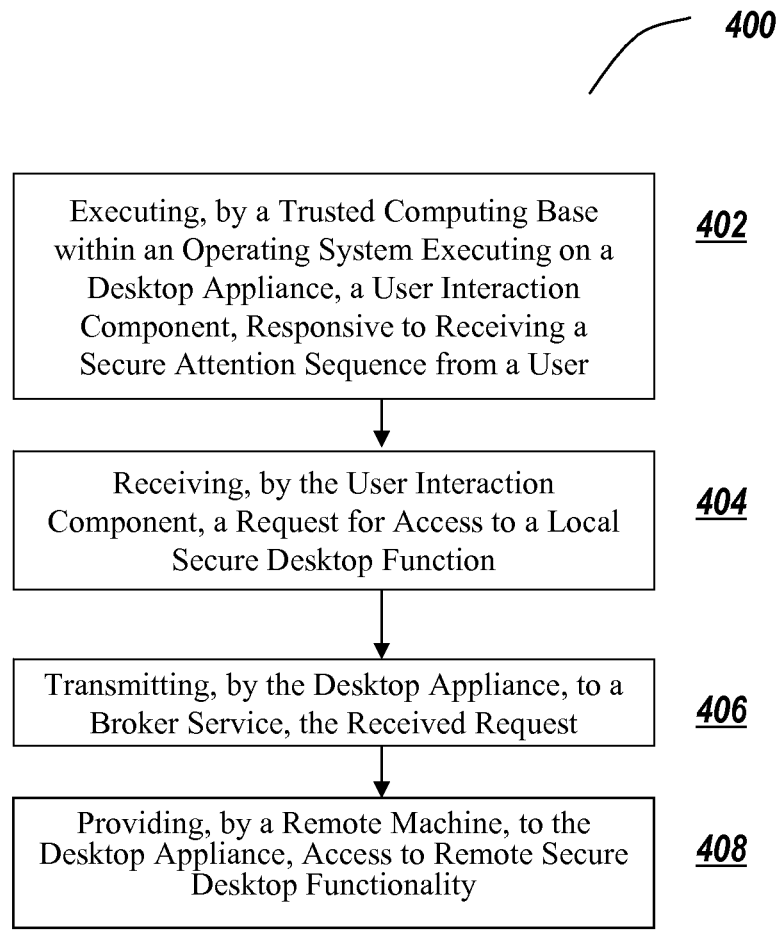
FIG. 4 is a flow diagram depicting one embodiment of a method for providing, by a trusted component, to a user of a desktop appliance, access to secure desktop functionality provided by a remote machine.

Referring now to FIG. 4, a flow diagram depicts one embodiment of a method for providing, by a trusted component, to a user of a desktop appliance, access to secure desktop functionality provided by a remote machine. In brief overview, the method includes executing, by a trusted computing base within an operating system executing on a desktop appliance, a user interaction component, responsive to receiving a secure-attention sequence from a user (402). The method includes receiving, by the user interaction component, a request for access to a local secure desktop function (404). The method includes transmitting, by the desktop appliance, to a broker service, the received request (406). The method includes providing, by the remote machine, to the desktop appliance, access to remote secure desktop functionality (408).

Referring now to FIG. 4, and in greater detail, the trusted computing base within the operating system executing on the desktop appliance, executes the user interaction component, responsive to receiving the secure-attention sequence from the user (402). In some embodiments, the trusted computing base executes the user interaction component 210 as described above in connection with FIGS. 2, 3A, and 3B.

The user interaction component receives a request for access to a local secure desktop function (404). In some embodiments, the secure desktop functionality is a security function offered in the Windows Security dialog available on the secure desktop of a Windows desktop PC. In other embodiments, a user does not specify whether the request is for access to a local secure desktop function or to a remote secure desktop function. In one of these embodiments, the user interaction component 210 determines whether to transmit, via the desktop appliance, the request to the remote broker service 240. In another of these embodiments, the desktop appliance 102 provides access to the local secure desktop functionality.

In one embodiment, the user interaction component 210 determines that the user should access local security functionality. In another embodiment, the user interaction component 210 directs the provisioning of access to local security functionality; for example, the user interaction component 210 may direct the trusted computing base to execute local security functionality and to provide the user with access to the execution of the local security functionality. In still another embodiment, such functionality may be functionality for terminating a session between a user and the desktop appliance 102.

In one embodiments, the user interaction component 210 determines that a remote machine 106' should provide the user with access to remote security functionality in response to the request for access to local security functionality; for example, the user may have requested access to functionality for enumerating processes executing on the remote machine 106', which may include functionality substantially similar to the WINDOWS Task Manager functionality. In another embodiment, the user interaction component 210 prevents execution, by the operating system, of a resource providing secure desktop functionality; for example, if the user interaction component 210 determines that the requested secure desktop functionality is functionality for terminating a connection between the desktop appliance 102 and the remote machine 106, the user interaction component 210 may prevent the desktop appliance 102 from executing functionality for terminating a connection between the user and the desktop appliance 102.

The desktop appliance transmits, to a broker service, the received request (406). In some embodiments, the broker service 240 receives the request and redirects the request to the desktop host 106'. In other embodiments, the desktop appliance transmits the request directly to the desktop host 106'. In further embodiments, the desktop connection component 230 executes on the desktop appliance 102 and transmits the received request to the remote machine 106. Depending on the nature of the function requested, the user interaction component may perform the function itself, may direct the execution of local secure desktop functionality, or, in conjunction with the broker interaction component 220 and the desktop connection component 230, request execution of remote secure desktop functionality. In one embodiment, the user interaction component 210 will return full control over display and input focus to the desktop connection component 230. In another embodiment, the user interaction component will direct the desktop appliance 102 to enter a 'locked' state where it retains full control over the display and input focus, and ensures that no user input is passed to the remote desktop or any local software component.

The remote machine provides, to the desktop appliance, access to remote secure desktop functionality (408). In some embodiments, the secure desktop functionality is functionality for placing the remote resource into a locked state. In one of these embodiments, the user interaction component 210 determines that the requested secure desktop functionality includes a request to lock a remotely-executing application. In another of these embodiments, the user interaction component 210 transmits an instruction to the remote machine 106 to place the remote resource into a locked state. In other embodiments, the user interaction component 210 determines that the desktop appliance 102 should enter a locked state. In one of these embodiments, the user interaction component 210 directs the operating system on the desktop appliance 102 to enter a locked state. In another of these embodiments, the user interaction component 210 transmits an indication to the remote machine 106 that the operating system executing on the desktop appliance 102 has entered a locked state. In still another of these embodiments, the user interaction component 210 transmits an instruction to the remote machine 106 to place the remote resource into a locked state. In still other embodiments, the user interaction component 210 determines that the remote machine 106' itself should enter a locked state, as opposed to one or more resources provided by the remote machine 106'. In further embodiments, entering a locked state prevents interaction by a user with a resource.

In one embodiment, if a user types a 'Windows-L' key combination while the desktop appliance 102 is connected to a remote desktop provided by the desktop host 106', the desktop appliance 102 may directly enter the locked state. In another embodiment, the remote desktop enters the locked state while the desktop appliance is connected (whether through user input processed by the desktop host or by the actions of applications running in the remote desktop session), and the desktop connection component 230 receives a notification of this event from the desktop host 106'. In still another embodiment, the desktop connection component 230 receives a notification that the remote desktop has become locked and causes the desktop appliance 102 to enter the locked state also.

In one embodiment, the desktop connection component 230 loses its connection to the desktop host 106' while the desktop appliance 102 is in the locked state and the desktop appliance 102 transitions to the pre-authenticated state after displaying a suitable message and receiving user acknowledgement. In this embodiment, if a local operating system logon session was created during a log-on process, it is destroyed; the desktop connection component 230, and possibly the broker interaction component 220, would normally be uninstantiated as well.

In one embodiment, if the desktop appliance 102 is in the locked state and the user generates the SAS, the user interaction component 210 is invoked to re-authenticate the user. This may be accomplished by using a function provided by the broker service 240 or the local operating system, or by reference to the credentials originally provided during a log-on process. In another embodiment, upon successful authentication, if the credentials are unchanged from the original authentication and the remote desktop has not sent a notification that it has entered the locked state, the desktop appliance 102 exits the locked state locally and returns full control to the desktop connection component 230.

In some embodiments, the secure desktop functionality is functionality for terminating a session between the user and the desktop appliance 102. In other embodiments, the secure desktop functionality is functionality for terminating a session between the desktop appliance 102 and a resource provided by the remote machine 106. In further embodiments, functionality for terminating a session is referred to as terminating for logging the user off of a session. In one embodiment, the user interaction component 210, in conjunction with the desktop connection component 230, initiates a log-off process from the user's remote desktop session, by communicating a disconnect request to the desktop host 106'. In another embodiment, the user interaction component 210 then returns full control over the display and input focus to the desktop connection component 230 and the desktop appliance 102. In such an embodiment, this allows the user to interact with the remote desktop and the resource(s) running in the remote desktop while the log off process is completed; in this embodiment, functionality may be provided allowing the user to abort the log-off process. In still another embodiment, when the log off is complete, the desktop connection component 230 returns full control to the user interaction component 210, which enters a pre-authentication state; such a state may provide limited functionality and, in some cases, may prevent users of the desktop appliance 102 from interacting with the desktop appliance 102 without re-authenticating. In yet another embodiment, the desktop connection component 230 may receive a notification from the desktop host 106' indicating that the log off process has competed.

In some embodiments, the secure desktop functionality is functionality for terminating execution of a resource provided by the desktop host 106'; this may be referred to as shut down functionality. In one of these embodiments, the desktop connection component 230 may receive a notification from the desktop host 106' indicating that shut down of the remote desktop is occurring. In another of these embodiments, when the desktop connection component 230 loses the connection to the desktop host 106' having received such a notification, it initiates shut down of the desktop appliance 102. In other embodiments, the desktop connection component 230 does not shut down the desktop appliance 102 but instead returns full control to the user interaction component 210 which enters the pre-authentication state.

In some embodiments, the secure desktop functionality is functionality for changing a password. In one of these embodiments, upon determining that the user has requested access to password changing functionality, the user interaction component 210 determines that the local password changing functionality should be invoked. In another of these embodiments, the user interaction component 210 displays a dialog substantially similar to the Windows Change Password dialog. In still another of these embodiments, the user interaction component 210 invokes a password change mechanism. In still another of these embodiments, the password change mechanism may use a local operating system function, a function provided by the broker service, or a suitable secure change password protocol such as the Kerberos change password protocol defined by RFC 3244.

In some embodiments, upon modification of a property of the desktop appliance by the local secure desktop functionality, the user interaction component 210 on the desktop appliance 102 transmits an identification of the modification to the remote machine 106'. In one of these embodiments, for example, upon successful modification of the user password, the user interaction component 210 conveys the changed password to the remote desktop. In another of these embodiments, the user interaction component 210 may direct the desktop connection component 230 to disconnect from the desktop host, and direct the broker interaction component 220 to initiate a log-on process with the broker service 240, which will then transmit updated authentication data or authentication credentials to the remote machine 106' before returning full control over the display and user input to the desktop connection component 230. In some embodiments, the desktop connection component 230 may communicate a new password to the desktop host 106' with a request to lock the remote desktop session and then unlock it with the new password. In one embodiment, this process avoids undesirable disruption of the connection from the desktop appliance to the desktop host, which may negatively affect remote desktop access to local appliance resources such as file storage devices or printers.

In one embodiment, the secure desktop functionality is functionality for enumerating any processes executed by a resource; for example, functionality for listing applications executed by an operating system providing a desktop environment to a user. In another embodiment, the secure desktop functionality provides functionality for identifying a level of performance provided by the desktop environment; for example, the functionality may describe a level of CPU usage or page file usage. In still another embodiment, the secure desktop functionality provides functionality substantially similar to that provided by the WINDOWS Task Manager. In yet another embodiment, the user interaction component 210 directs the desktop connection component 230 to signal the desktop host 106' to start a Task Manager component provided by a remotely executing resource, such as a desktop environment providing access to a remote desktop session. In some embodiments, user input to the remote resource of a key combination—such as Ctrl-Shift-Esc—is simulated by the user interaction component 210.

In some embodiments, the methods described herein include functionality for suppression of 'auto-play' or 'plug-and-play' responses to insertion of removable devices (e.g., USB drives or CDs) on the desktop appliance 102. In other embodiments, the methods described herein include functionality for protecting user input focus.

In some embodiments, the user may change their password as part of the process of user authentication to the operating system on the desktop appliance 102 or the broker service 240, e.g., if the password has expired or been flagged as "must change on next logon", or "the password will expire in the next N days" and the user elects to change it now. In other embodiments, the user elects to change their password while connected to a remote desktop provided by the desktop host 106. In one of these embodiments, the user generates the Secure Attention Sequence (e.g., types Ctrl-Alt-Del), the desktop appliance operating system invokes the local user interaction component 210 to offer 'secure desktop' functionality substantially equivalent to that provided by the Windows Security dialog, and the user invokes a Change Password function, causing the user interaction component 210 to display a screen allowing the user to enter their current password for verification and a double-entry field for the new password. In another of these embodiments, upon receipt of the change password instructions, the user interface component 210 invokes a password change mechanism; the password change mechanism may use a local operating system function, a function provided by the broker service, or a suitable secure change password protocol such as the Kerberos change password protocol defined by RFC 3244. In some embodiments, a broker service 240 is used and the username, current password and new password are transmitted using a presentation layer protocol to the broker service 240, which calls an operating system function to effect the change. In other embodiments, a secure change password protocol such as Kerberos is used. In one of these embodiments, the user interaction component 210 generates a cryptographically protected data packet using the username and current password and containing the new password encrypted by a randomly generated security key, pursuant to the specification provided in RFC 3244. In another of these embodiments, this data packet is transmitted to the appropriate Kerberos authentication server, e.g., a Microsoft Active Directory domain controller; an authentication server may be identified using a standardized series of DNS queries based on the domain name portion of the user's fully qualified name.

In some embodiments, upon successful modification of a user password, the user interaction component 210 arranges to convey the changed password to the remote desktop provided by the remote machine 106. In one of these embodiments, by conveying the changed password to the remote machine 106, the user interaction component 210 ensures that the remote desktop can further authenticate the user to other remote machines offering network services, when the authentication protocol used by the remote machines uses authentication data derived from the user's password. In another of these embodiments, functionality provided by an operating system used on the desktop host allows re-authentication to unlock a locked desktop using the current password, which may be different from the password initially used to logon to the desktop. In such an embodiment, re-authenticating with the current credentials to unlock the remote desktop updates the authentication data cached by the desktop host to enable further authentication to remote machines.

In some embodiments, conveying the changed password to the desktop host may be effected by causing the desktop connection component 230 to disconnect from the desktop host 106' without ending the user's remote desktop session, causing the broker interaction component 210 to initiate a log-on process, thus providing the updated user credentials to the remote desktop session. In one of these embodiments, the user interaction component 210 directs the desktop connection component 230 to disconnect from the desktop host 106', either by means of a predefined instruction transmitted over the presentation layer protocol or by termination of the network connection(s) transporting the protocol, causing the desktop host session 230 to enter a locked state. In another of these embodiments, the desktop host 106' communicates to the broker service 240 a notification of the change in status, indicating that the identified user is logged in but that the desktop host 106' is not connected to a desktop appliance 102 (i.e. is in a disconnected state). In still another of these embodiments, the user interaction component 210 separately signals the broker interaction component 220 to initiate a log-on sequence and to reconnect to the desktop host 106'. In still even another of these embodiments, a log-on process described above occurs, although the desktop host 106' authenticates the user in order to exit from the locked state. In one embodiment, the credentials used to unlock a Windows desktop can be different from the credentials used to logon initially provided that the credential authority (e.g. Microsoft Active Directory domain controller) can be consulted to verify the current credentials. In other embodiments, the desktop connection component 230 may communicate the new password to the desktop host 106' over a secure channel within the presentation layer protocol. In one of these embodiments, this communication may be part of a request to lock the remote desktop session and then unlock it with the new password. In another of these embodiments, the desktop host 106' may use an interface to update the cached authentication data. Such an embodiment avoids undesirable disruption of the presentation layer protocol connection from the desktop appliance 102 to the desktop host 106', which may negatively affect remote desktop access to local appliance resources such as file storage devices or printers. In further embodiments, the user interaction component 210 informs the user of the outcome of the password change mechanism, and continues to display the secure desktop screen. In one of these embodiments, if the user dismisses the secure desktop screen, the user interaction component 210 will return full control over display and input focus to the desktop connection component 230.

In one embodiment, when a remote machine locks, it passes the lock event to the local client machine and the local client machine locks as well. When the user unlocks the local machine, the presentation layer protocol disconnects and reconnects the session as a way of avoiding having to unlock both machines.

In one embodiment, when a user logs off a desktop host, the user is logged off the desktop appliance as well. In another embodiment, when a user logs off a desktop appliance, the user is logged off the desktop host as well.

In one embodiment, when a desktop host is locked, the desktop appliance is locked as well. In another embodiment, when the local machine is unlocked, a presentation layer protocol client agent detects that the local machine has been unlocked and disconnects and reconnects the session.

In one embodiment, the desktop appliance operating system is a version of MICROSOFT WINDOWS such as WINDOWS XP or XP Embedded and the user interaction component 210 is winlogon.exe with msgina.dll. In another embodiment, Winlogon.exe coordinates with other parts of the Windows operating system to authenticate user credentials and create a local logon session by normal means, allowing full use of Windows policy controls and mechanisms such as enforcing a domain authentication policy and applying standard Group Policy processing. In still another embodiment, the broker interaction and desktop connection components run in the local logon session with normal user or possibly reduced user privileges. In yet another embodiment, the operating system ensures that Winlogon always receives full control over the display and user input focus whenever the SAS is received, thus providing the same level of protection to the local and remote user logon sessions as is provided to a Windows desktop PC.

In some embodiments, the user interaction component 210 coordinates with the broker interaction and desktop connection components by means of existing Windows interfaces and mechanisms. In one of these embodiments, log-on requests can pass user input control to the broker interaction and desktop connection components by several means, for instance by setting the broker interaction component 220 to be the Windows shell program. In another of these embodiments, user credentials can be conveyed to the broker interaction component 220 or the desktop connection component 230, or both, by several means; for instance by using the secondary network provider interface to receive credentials and private means to make them available to selected components. In still another of these embodiments, the broker interaction component 220 can use standard Windows authentication interfaces such as Security Support Provider Interface (SSPI) to silently authenticate to the broker service 240 without communicating the user credentials or having direct access to them. In yet another of these embodiments, Log Off and Shut Down requests cause notification messages to be sent to all programs running in the local logon session, including the broker interaction and desktop connection components; any component can delay or even abort the Log Off or Shut Down if appropriate.

In another of these embodiments, a request to Change Password causes notifications to be sent to secondary network providers, allowing them to cascade notification by private means to other components if necessary. In still another of these embodiments, requests to Lock and Unlock access to a resource cause notifications to be sent to any component registered to receive such notifications from the System Event Notification Service (SENS). In still even another of these embodiments, a request to launch of Task Manager can be intercepted by means of registering a debugger that should be started when the taskman.exe component is started. The debugger component can perform arbitrary actions, such as simulate user keyboard input to the remote desktop session for instance using interface mechanisms provided by the desktop connection component. In some embodiments, a desktop appliance power button is used as a custom Secure Attention Sequence for the purpose of initiating a log-on process. In one of these embodiments, this addresses the SAS handling requirements.

In some embodiments, a user may execute a desktop connection client on a private desktop, when a local operating system is a version of a WINDOWS operating system, in order to provide greater protection for user input focus. In other embodiments, the methods and systems includes support for an inline brokering model, whereby the desktop appliance connects to a trusted remote desktop to display the secure desktop, at least for initial authentication during a log-on process. In still other embodiments, the methods and systems include support an alternative SAS, such as a custom user input button on the desktop appliance, for when users want to initiate a log-on process, allowing Ctrl-Alt-Del to be passed to the remote desktop for processing. In still even other embodiments, a trusted communication path is implemented from the local operating system to the desktop host operating system, in such a way as to provide attestation of the desktop host operating system integrity.

Although the embodiments described above refer to desktop appliances that operate versions of the WINDOWS operating system, a desktop appliance may operate any type of available operating system, include those described above in connection with FIGS. 1A-1C. In one embodiment, the desktop appliance 102 includes functionality for supporting execution of non-WINDOWS operating system. In another embodiment, for example, the desktop appliance 102 may execute a Linux-based operating system. In still another embodiment, a user experience on a non-WINDOWS operating system is substantially similar as the user experience on a WINDOWS operating system.

In one embodiment, the desktop host 106' executes an X server application that communicates with resources executing on the desktop appliance 102, such as the user interaction component 210. In another embodiment, the user interaction component 210 prevents a key combination, such as Ctrl-Alt-Backspace, from terminating an execution of the X server on the desktop host 106'. In still another embodiment, the user interaction component 210 prevents a key combination, such as Ctrl-Alt-Backspace, from terminating an execution of the X server on the desktop host 106'. In still even another embodiment, the user interaction component 210 prevents a key combination, such as Ctrl-Alt-F1, from changing a virtual terminal provided by the desktop host 106'. In yet another embodiment, the user interface 210 prevents a key combination, such as Ctrl-Alt-F1, from changing a virtual terminal provided by the desktop host 106'. In some embodiments, the desktop host 106' is configured to generate a single display, regardless of a number of monitors used by the desktop appliance 102.

In some embodiments, the user interaction component 210 executes a display manager component. In one embodiment, the display manager shows a log-on screen from start-up. In another embodiment, the display manager initiates execution of a log-in/greeting application. In still another embodiment, the display manager starts a screen saver application. In still even another embodiment, the display manager starts a Window Manager application. In yet another embodiment, the display manager starts another Window Manager for selected accounts (terminal manufacturer configurable).

In some embodiments, the user interaction component 210 executes a log-in/greeting application. In one embodiment, the log-in/greeting application supports Active Directory credentials. In another embodiment, the log-in/greeting application can shut down the desktop appliance 102.

In some embodiments, the user interaction component 210 executes a screen locking application. In one embodiment, the screen locking application supports Active Directory credentials. In another embodiment, the screen locking application notifies at least one of the user interaction component 210 and a presentation layer protocol client of unlock events.

In some embodiments, the user interaction component 210 executes a pluggable authentication module (PAM). In one embodiment, the PAM can authenticate against Windows Active Directory credentials. In another embodiment, the PAM can be used to change a user password.

In some embodiments, the user interaction component 210 executes a window manager. In one embodiment, the window manager intercepts Ctrl-Alt-Del and Windows-L key sequences. In another embodiment, the window manager launches a Launcher application on start-up. In still another embodiment, the window manager has no menu bars, task bars or start menus. In still even another embodiment, the window manager launches Secure Desktop App on receiving an identification that the user has entered a key combination such as Ctrl-Alt-Del. In yet embodiment, the window manager launches Screen Lock on Windows-L and when given command. In one embodiment, the window manager logs user out when given a command to do so, or when the desktop connection component terminates. In another embodiment, the window manager shuts down the desktop appliance 102 when given a command to do so.

In one embodiment, the user interaction component 210 executes a secure desktop application. In another embodiment, the user interaction component 210 is a secure desktop application. In one embodiment, the secure desktop application replicates Windows Secure Desktop functionality. In another embodiment, the secure desktop application is launched by Window Manager when a user presses Ctrl-Alt-Del. In still another embodiment, the secure desktop application has an initial screen with Lock, Logoff, Shut down, Change Password, Task Manager and Cancel. In still even another embodiment, the secure desktop application displays the current user's name; requests to lock, logoff or shutdown may each result in sending the message to at least one of the user interaction component 210 and a presentation layer protocol client, which may then forward the request to a Window Manager application. In yet another embodiment, the secure desktop application allows Change Password commands to launch Change Password applications. In one embodiment, Task Manager instructs the desktop appliance 102 to launch a Task Manager application. In another embodiment, choosing Cancel or pressing Esc quits the secure desktop application.

In one embodiment, the user interaction component 210 executes a change password application. In one embodiment, this application launches a dialog with the entry fields old password, new password and confirm new password. In another embodiment, the application uses PAM to update user passwords.

In one embodiment, the user interaction component 210 executes a launcher application. In one embodiment, the launcher application uses local desktop credentials. In another embodiment, the launcher application has a default server to connect to for presentation layer protocol agent information. In another embodiment, the launcher application automatically enumerates applications. In still another embodiment, the launcher application automatically launches first application on list. In yet another embodiment, the launcher application displays a status dialog whilst doing this. In one embodiment, the launcher application reports failures in this process to the user. In another embodiment, the launcher application terminates if the client process terminates unexpectedly. In still another embodiment, the launcher application processes unlock events by unlocking a remote machine.

In one embodiment, the user interaction component 210 communicates with a presentation layer protocol agent executing on the desktop appliance 102. In another embodiment, the user interaction component 210 is part of a presentation layer protocol agent. In still another embodiment, the presentation layer protocol agent directs a display, on the desktop appliance 102, of data generated by an execution of a resource (such as an application, a plurality of applications, a desktop, a virtual machine executing an operating system in which at least one application executes, or other resource) on a remote machine 106'.

In one embodiment, the presentation layer protocol agent uses all display area available from the desktop appliance 102, regardless of number and size of monitors. In another embodiment, the presentation layer protocol agent may signal a Window Manager to initiate a log-off process. In another embodiment, the presentation layer protocol agent may signal a Window Manager to shut down the desktop appliance 102. In still another embodiment, the presentation layer protocol agent handles unlock events by unlocking the remotely-executing resource.

In some embodiments, the user interaction component 210 executes on a desktop appliance 102 executing a Linux Operating system. In one of these embodiments, upon powering on the desktop appliance 102, a log-in interface is displayed. In another of these embodiments, the user interaction component 210 receives user authentication credentials as described above. In still another of these embodiments, single sign-on functionality is provided to the user. In yet another of these embodiments, the authentication credentials may be MICROSOFT ACTIVE DIRECTORY credentials.

In some embodiments, regardless of an operating system executed by the desktop appliance 102, the user interaction component 210 includes functionality for processing key combinations entered by a user. In one of these embodiments, for example, the user interaction component 210 receives an identification that a user has pressed a meta key—such as a control key, an alt key, a WINDOWS key, or a menu key—and determines whether to direct the local operating system to provide functionality associated with the meta key or to direct the desktop host 106' to provide the associated functionality. In other embodiments, regardless of an operating system executed by the desktop appliance 102, the user interaction component 210 includes functionality for providing access to local or remote secure desktop functionality—including, without limitation, functionality for shutting down sessions, logging off sessions, locking and unlocking access to sessions, viewing enumerations of active resources available to a user of the desktop appliance, and changing passwords used to access resources—and determining whether to direct the local operating system to provide the secure desktop functionality or to direct the desktop host 106' to provide the secure desktop functionality.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for authenticating, by a trusted component, a user of a desktop appliance to a remote machine, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for providing, by a trusted component, to a user of a desktop appliance, access to secure desktop functionality provided by a remote machine, the method comprising:

executing, by a trusted computing base within an operating system executing on a desktop appliance, a user interaction component, responsive to receiving a secure attention sequence from a user;

receiving, by the executed user interaction component, a request directed to the operating system for access to a local secure desktop function that is one of:
a request to lock the desktop appliance;
a request to logoff from the desktop appliance;
a request to shut down the desktop appliance;
a request to change a password on the desktop appliance; and
a request to launch a Task Manager application on the desktop appliance;

transmitting, by the desktop appliance, to a broker service, the received request; and providing, by a remote machine, to the desktop appliance, access to a remote secure desktop function in satisfaction of the request for access to the local secure desktop function.

2. The method of claim 1, wherein transmitting, by the desktop appliance to a broker service, the received request comprises transmitting, by the desktop appliance, to the remote machine, the received request.

3. The method of claim 1 further comprising identifying, by the broker service, the remote machine.

4. The method of claim 1 further comprising preventing, by the user interaction component, execution, by the operating system, of a resource providing secure desktop functionality.

5. The method of claim 1 further comprising: determining whether to transmit, by the desktop appliance, to a remote broker service, the received request; and providing, by the desktop appliance, access to the local secure desktop functionality.

6. The method of claim 1, wherein the secure attention sequence is one of: a first key combination of a control key, an alt key, and a delete key; a second key combination including a menu key; or a third key combination including an operating system specific meta key.

7. The method of claim 5 further comprising transmitting, by the desktop appliance, to the remote machine, an identification of a modification made by the local secure desktop functionality.

8. A system for providing, by a trusted component, to a user of a desktop appliance, access to secure desktop functionality provided by a remote machine comprising:

a user interaction component executed by a trusted computing base within an operating system executing on a desktop appliance, receiving a user request directed to the operating system, for access to a local secure desktop function that is one of:
a request to lock the desktop appliance;
a request to logoff from the desktop appliance;
a request to shut down the desktop appliance;
a request to change a password on the desktop appliance; and
a request to launch a Task Manager application on the desktop appliance;

a broker service receiving the request from the desktop appliance, identifying a remote machine and transmitting the received request to the remote machine; and a remote machine receiving the request and providing, to the desktop appliance, access to a remote secure desktop function in satisfaction of the request for access to the local secure desktop function.

9. The system of claim 8 further comprising a broker interaction component executing on the desktop appliance and transmitting the request to the broker service.

10. The system of claim 8 further comprising a desktop connection component executing on the desktop appliance and transmitting the received request to the remote machine.

11. A system for providing, by a trusted component, to a user of a desktop appliance, access to secure desktop functionality provided by a remote machine comprising:

means for executing, by a trusted computing base within an operating system executing on a desktop appliance, a user interaction component, responsive to receiving a secure attention sequence from a user;

means for receiving, by the executed user interaction component, a request directed to the operating system for access to a local secure desktop function that is one of:

a request to lock the desktop appliance;
a request to logoff from the desktop appliance;
a request to shut down the desktop appliance;
a request to change a password on the desktop appliance; and
a request to launch a Task Manager application on the desktop appliance;

means for transmitting, by the desktop appliance, to a broker service, the received request; and means for providing, by a remote machine, to the desktop appliance, access to a remote secure desktop function in satisfaction of the request for access to the local secure desktop function.

12. The system of claim 11, wherein means for transmitting, by the desktop appliance to a broker service, the received request comprises means for transmitting, by the desktop appliance, to the remote machine, the received request.

13. The system of claim 11 further comprising means for identifying, by the broker service, the remote machine.

14. The system of claim 11 further comprising means for preventing, by the user interaction component, execution, by the operating system, of a resource providing secure desktop functionality.

15. The system of claim 11 further comprising:
means for determining whether to transmit, by the desktop appliance, to a remote broker service, the received request; and
means for providing, by the desktop appliance, access to the local secure desktop functionality.

16. The system of claim 11, wherein the secure attention sequence is one of: a first key combination of a control key, an alt key, and a delete key; a second key combination including a menu key; or a third key combination including an operating system specific meta key.

17. The system of claim 15 further comprising means for transmitting, by the desktop appliance, to the remote machine, an identification of a modification made by the local secure desktop functionality.

* * * * *